(12) United States Patent
Seki et al.

(10) Patent No.: US 10,392,017 B2
(45) Date of Patent: Aug. 27, 2019

(54) VEHICLE CONTROL SYSTEM

(71) Applicant: TOYOTA JIDOSHA KABUSHIKI KAISHA, Toyota-shi, Aichi-ken (JP)

(72) Inventors: Yushi Seki, Susono (JP); Kensei Hata, Shizuoka-ken (JP); Takahito Endo, Shizuoka-ken (JP); Yasuhiro Oshiumi, Gotemba (JP); Yasuyuki Kato, Numazu (JP); Katsuya Iwazaki, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 19 days.

(21) Appl. No.: 15/688,363

(22) Filed: Aug. 28, 2017

(65) Prior Publication Data
US 2018/0057006 A1  Mar. 1, 2018

(30) Foreign Application Priority Data

Aug. 30, 2016 (JP) .................. 2016-167748

(51) Int. Cl.
*B60W 30/18* (2012.01)
*B60W 10/08* (2006.01)
(Continued)

(52) U.S. Cl.
CPC ....... *B60W 30/18027* (2013.01); *B60K 6/445* (2013.01); *B60W 10/08* (2013.01); *B60W 10/18* (2013.01); *B60W 10/182* (2013.01); *B60W 10/184* (2013.01); *B60W 10/20* (2013.01); *B60W 10/26* (2013.01);
(Continued)

(58) Field of Classification Search
CPC ..... B60W 30/18027; B60W 30/18109; B60W 30/182; B60W 10/08; B60W 10/18; B60W 10/20; B60W 10/26; B60W 10/182; B60W 10/184; B60W 50/0097; B60W 50/06;
(Continued)

(56) References Cited

U.S. PATENT DOCUMENTS

2013/0066519 A1    3/2013  Yoshikawa et al.
2015/0339928 A1*  11/2015  Ramanujam .......... G08G 1/202
                                                      701/23

(Continued)

FOREIGN PATENT DOCUMENTS

JP    H06-72296 A      3/1994
JP    2007-118800 A    5/2007
(Continued)

*Primary Examiner* — Jelani A Smith
*Assistant Examiner* — Bakari Underwood
(74) *Attorney, Agent, or Firm* — Hunton Andrews Kurth LLP

(57) ABSTRACT

A vehicle control system is provided to allow an autonomous vehicle to promptly launch after picking up a passenger. A controller comprises a drive controller for controlling a drive motor, and electric power is supplied to the drive motor from a power source. A main switch is manipulated by the controller to selectively connect and disconnect the drive controller to/from the power source. The controller is configured to propel the vehicle autonomously to a pickup location to pick up a passenger, and to turn on the main switch if the passenger is detected within a predetermined area at the pickup location.

6 Claims, 3 Drawing Sheets

(51) Int. Cl.
*B60W 10/184* (2012.01)
*B60W 10/20* (2006.01)
*B60W 10/26* (2006.01)
*B60W 30/182* (2012.01)
*B60W 50/00* (2006.01)
*B60W 50/06* (2006.01)
*B60K 6/445* (2007.10)
*B60W 50/08* (2012.01)
*B60W 10/18* (2012.01)

(52) U.S. Cl.
CPC .... *B60W 30/182* (2013.01); *B60W 30/18109* (2013.01); *B60W 50/0097* (2013.01); *B60W 50/06* (2013.01); *B60W 50/082* (2013.01); *B60W 2050/0002* (2013.01); *Y02T 10/6239* (2013.01)

(58) Field of Classification Search
CPC ........ B60W 50/082; B60W 2050/0002; G05D 1/021
See application file for complete search history.

(56) References Cited

U.S. PATENT DOCUMENTS

2017/0123423 A1    5/2017  Sako et al.
2018/0208243 A1*   7/2018  Kim .................... B62D 15/025

FOREIGN PATENT DOCUMENTS

| JP | 2013062980 A | 4/2013 |
| JP | 2013159202 A | 8/2013 |
| JP | 2014-106854 A | 6/2014 |
| JP | 2015120403 A | 7/2015 |
| WO | 2015166811 A1 | 11/2015 |

* cited by examiner

VEHICLE CONTROL SYSTEM

CROSS REFERENCE TO RELATED APPLICATIONS

The present invention claims the benefit of priority to Japanese Patent Application No. 2016-167748 filed on Aug. 30, 2016 with the Japanese Patent Office, the entire contents of which are incorporated herein by reference in its entirety.

BACKGROUND

Field of the Invention

Embodiments of the present disclosure relate to the art of a vehicle control system configured to operate the vehicle autonomously.

Discussion of the Related Art

JP-A-2014-106854 describes an automatic driving vehicle control apparatus for operating vehicles autonomously without a driver. The control system of this kind requires a considerable electricity to carry out calculations. For this reason, it is preferable to apply the control system of this kind to a vehicle having a motor serving not only as a prime mover but also as a power source.

The vehicle to which the control system of this kind may travel autonomously without requiring a driver to a point to pick up a passenger while manipulating a steering device, an accelerator and so on by a controller. In the vehicle of this kind, standby electricity required by the controller may be reduced by cutting electricity to the controller after arriving at the pickup location. However, if the controller is shutdown, it will take long time to start up the controller again after boarding of the passenger on the vehicle. Consequently, the vehicle may not be launched promptly.

SUMMARY

Aspects of embodiments of the present disclosure have been conceived noting the foregoing technical problems, and it is therefore an object of the present disclosure is to provide a vehicle control system configured to allow an autonomous vehicle to promptly launch after picking up a passenger.

The vehicle control system according to the embodiments of the present disclosure is applied to a vehicle comprising a power source, a drive motor, a brake device that applies braking torque to a wheel, and a steering system that turns the wheels. The vehicle control system comprises a controller that controls the drive motor, the brake device and the steering system to operate the vehicle autonomously. The controller comprises a drive controller which controls the drive motor and to which electric power is supplied from the power source. The vehicle control system further comprises a main switch that is manipulated by the controller to selectively connect and disconnect the drive controller to/from the power source. The controller is configured to propel the vehicle autonomously to a pickup location to pick up a passenger, and to turn on the main switch if the passenger is detected within a predetermined area at the pickup location.

In a non-limiting embodiment, the vehicle control system may further comprise a relay switch that is manipulated by the controller to selectively connects and disconnects the drive motor to/from the power source. In addition, the controller may be further configured to turn off the relay switch if the passenger is detected within the predetermined area at the pickup location, and if an elapsed time from a time point at which the passenger was detected to a time point at which the passenger commands the vehicle to start autonomous propulsion is longer than a first predetermined period.

In a non-limiting embodiment, the vehicle control system may further comprise: a torque transmission route for delivering an output torque of the drive motor to drive wheels; and a parking lock mechanism that stops a rotation of a predetermined rotary member arranged in the torque transmission route irrespective of electric power supply from the power source, and that is manipulated by the controller to selectively allow and inhibit the rotary member to rotate. In addition, the controller may be further configured to stop the rotation of the rotary member by the parking lock mechanism if the elapsed time is longer than the first predetermined period.

In a non-limiting embodiment, the controller may be further configured to turn off the main switch if the passenger is not detected within the predetermined area at the pickup location, and if a waiting time from a time point at which the vehicle arrives at the pickup location to a time point at which the passenger appears within the predetermined area at the pickup location is longer than a second predetermined period.

In a non-limiting embodiment, the vehicle control system may further comprise a relay switch that that is manipulated by the controller to selectively connects and disconnects the drive motor to/from the power source. In addition, the controller may be further configured to turn off the relay switch if the waiting time is longer than the second predetermined period.

In a non-limiting embodiment, the vehicle control system may further comprise: a torque transmission route for delivering an output torque of the drive motor to drive wheels; and a parking lock mechanism that stops a rotation of a predetermined rotary member arranged in the torque transmission route irrespective of electric power supply from the power source, and that is manipulated by the controller to selectively allow and inhibit the rotary member to rotate. In addition, the controller may be further configured to stop the rotation of the rotary member by the parking lock mechanism if the waiting time is longer than the second predetermined period.

In a non-limiting embodiment, the controller may be further configured to turn off the main switch if the waiting time is longer than the second predetermined period, and to turn on the main switch again when the passenger approaches the predetermined area at the pickup location after turning off the main switch.

Thus, according to the embodiments of the present disclosure, the controller is configured to turn on the main switch thereby energizing the drive controller for controlling the drive motor if the passenger is detected within a predetermined area at the pickup location after arrival of the vehicle at the pickup location. That is, the drive controller has already been started when the passenger gets in the vehicle, or when the passenger commands the vehicle to start autonomous propulsion. According to the embodiments of the present disclosure, therefore, the vehicle is allowed to promptly start autonomous propulsion.

As described, the controller is further configured to turn off the relay switch to interrupt electric power supply to the drive motor if the passenger is detected within the predetermined area at the pickup location, and if the aforementioned elapsed time is longer than the first predetermined period. According to the embodiments of the present disclosure, therefore, standby power supplied to the drive motor may be saved.

As also described, the controller is further configured to stop the rotation of the rotary member by the parking lock mechanism when interrupting electric power supply to the drive motor. According to the embodiments of the present disclosure, therefore, a power loss resulting from actuating the brake device may be reduced.

As also described, the controller is further configured to temporality turn off the main switch if the waiting time to pick up the passenger at the pickup location is longer than the second predetermined period. According to the embodiments of the present disclosure, therefore, electric power consumption during waiting for the passenger may be reduced.

In addition, the controller is further configured to turn off the relay switch to interrupt electric power supply to the drive motor if the waiting time to pick up the passenger at the pickup location is longer than the second predetermined period. According to the embodiments of the present disclosure, therefore, standby power supplied to the drive motor may be saved.

In this case, the controller also stops the rotation of the rotary member by the parking lock mechanism. According to the embodiments of the present disclosure, therefore, a power loss resulting from the brake device may also be reduced.

In this case, when the passenger appears at the pickup point after turning off the main switch, the controller turns on the main switch again to startup the drive controller. According to the embodiments of the present disclosure, therefore, the vehicle is allowed to promptly start autonomous propulsion when the passenger gets in the vehicle, or when the passenger commands the vehicle to start autonomous propulsion.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Embodiments of the present disclosure will now be explained with reference to the accompanying drawings. The control system according to the embodiments of the present disclosure may be applied to a hybrid vehicle powered by an engine and a motor(s), and an electric vehicle powered by the motor(s). In the vehicles of these kinds, electric power may be supplied to the motor not only from a battery but also from a fuel cell.

Figure 1:
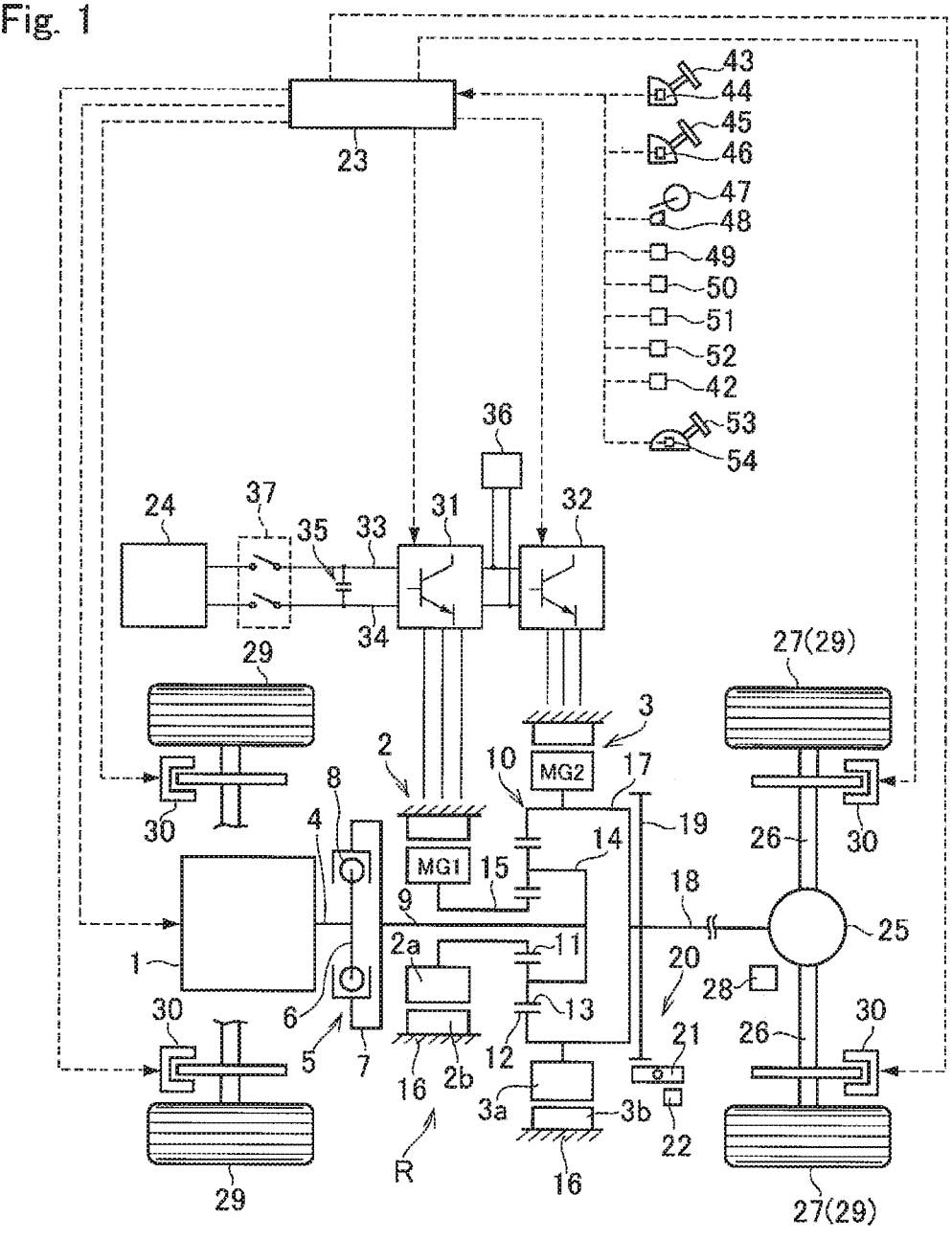
FIG. 1 is a schematic illustration showing a structure of a vehicle to which the control system according to the embodiment of the present disclosure is applied.

Referring now to FIG. 1, there is schematically shown a structure of a hybrid vehicle (as will be simply called the "vehicle" hereinafter) Ve to which the control system according to the embodiments of the present disclosure is applied. In the vehicle Ve, a prime mover includes an engine 1, a first motor 2 and a second motor 3. A damper device 5 is disposed on an output shaft 4 of the engine 1 to absorb vibrations resulting from torque pulse. The damper device 5 comprises an input member 6 connected to the output shaft 4 of the engine 1, an output member 7 that is allowed to rotate relatively to the input member 6, and a plurality of elastic members 8 arranged in a circular manner at regular intervals to transmit torque of the input member 6 to the output member 7.

One end of an input shaft 9 is connected to the output member 7 to be rotated integrally therewith, and other end of the input shaft 9 is connected to a single-pinion planetary gear unit 10. The planetary gear unit 10 comprises a sun gear 11 fitted onto the input shaft 9, a ring gear 12 arranged concentrically with the sun gear 11, a plurality of pinion gears 13 interposed between the sun gear 11 and the ring gear 12, and a carrier 14 supporting the pinion gears 13 while allowing to revolve around the sun gear 11.

A first cylindrical shaft 15 extends from the sun gear 11 on the input shaft 9 toward the engine 1 to be connected to the first motor 2. For example, a permanent magnet type synchronous motor having a generating function may be used as the first motor 2. In the first motor 2, a rotor 2a is connected to the first cylindrical shaft 15 of the sun gear 11 to be rotated integrally therewith, and a stator 2b is fixed to a stationary member 16 such as a housing.

A second cylindrical shaft 17 extends from the ring gear 12 toward the second motor 3, and a rotor 3a of the second motor 3 is connected to the second cylindrical shaft 17 to be rotated integrally therewith. A stator 3b of the second motor 3 is fixed to the stationary member 16 such as a housing.

A leading end of the second cylindrical shaft 17 is connected to an output shaft 18 as a rotary member to be rotated integrally therewith, and a parking gear 19 as an external gear is fitted onto the output shaft 18 to be rotated integrally therewith. A parking lock mechanism 20 is arranged outside of the parking gear 19. The parking lock mechanism 20 comprises a parking pawl 21 and a parking actuator 22. The parking actuator 22 may be actuated not only manually by a passenger but also automatically by an electronic control unit (as will be called the "controller" hereinafter) 23 to bring the parking pawl 21 into engagement with the parking gear 19 thereby locking the output shaft 18. An engagement between the parking pawl 21 and the parking gear 19 may be maintained even after shutting down a battery as a power source 24.

A leading end of the output shaft 18 is connected to a differential gear unit 25, and the differential gear unit 25 is connected to a pair of drive wheels 27 through drive shafts 26 extending laterally. The drive wheels 27 are turned by a steering system 28. Rotations of the drive wheels 27 and another pair of wheels 29 are individually stopped by a brake device 30.

An operating mode of the vehicle Ve may be selected from a hybrid mode (to be abbreviated as the "HV mode" hereinafter) in which the vehicle Ve is powered at least by the engine 1, and an electric vehicle mode (to be abbreviated as the "EV mode" hereinafter) in which the vehicle Ve is powered by at least one of the first motor 2 and the second motor 3. Specifically, in the HV mode, the engine 1 generates power in accordance with a required drive force calculated by the controller 23, and the first motor 2 generates reaction torque in such a manner as to deliver the output power of the engine 1 to the drive wheels 27 through the planetary gear unit 10. In this situation, electric power generated by the first motor 2 may be supplied to the second motor 3 so that an output torque of the second motor may be applied to the second cylindrical shaft 17. That is, the output power of the engine 1 may be translated partially into the electric power by the first motor 2, and then translated into kinetic energy again by the second motor 3 to be applied to a torque transmission route R between the engine 1 and the drive wheels 27. By contrast, when the first motor 2 serves as a motor while establishing the reaction torque, output torque of the first motor 2 applied to the transmission route R may be translated into electric power by the second motor 3, thereby reducing power transmitted through the transmission route R.

In the EV mode, the second motor 3 is operated as a motor in such a manner as to achieve a required drive force calculated by the controller 23. In this situation, fuel supply to the engine 1 and power supply to the first motor 2 may be interrupted.

As shown in FIG. 1, the first motor 2 is connected to a first inverter 31, and the second motor 3 is connected to a second inverter 32. The first inverter 31 and the second inverter 32 are also connected to an output terminal of the battery 24 through a positive bus line 33 and a negative bus line 34. The first motor 2 and the second motor 3 are also connected to each other through the positive bus line 33 and the negative bus line 34 so that electric power generated by one of the motors 2 and 3 is supplied to the other motor 2 or 3. A capacitor 35 for storing electric power is connected parallel to the positive bus line 33 and the negative bus line 34, and an auxiliary 36 e.g., a compressor for activating an air conditioner is also connected to the positive bus line 33 and the negative bus line 34. In order to selectively allow and interrupt power supply from the battery 24 to the first inverter 31 and the second inverter 32, a relay switch 37 is individually disposed on the positive bus line 33 and the negative bus line 34 between the output terminal of the battery 24 and the first inverter 31 and the second inverter 32. The relay switch 37 may be turned on and turned off manually by manipulating a switch button or key, but also automatically at desired time by setting a timer or the controller 23.

Figure 2:
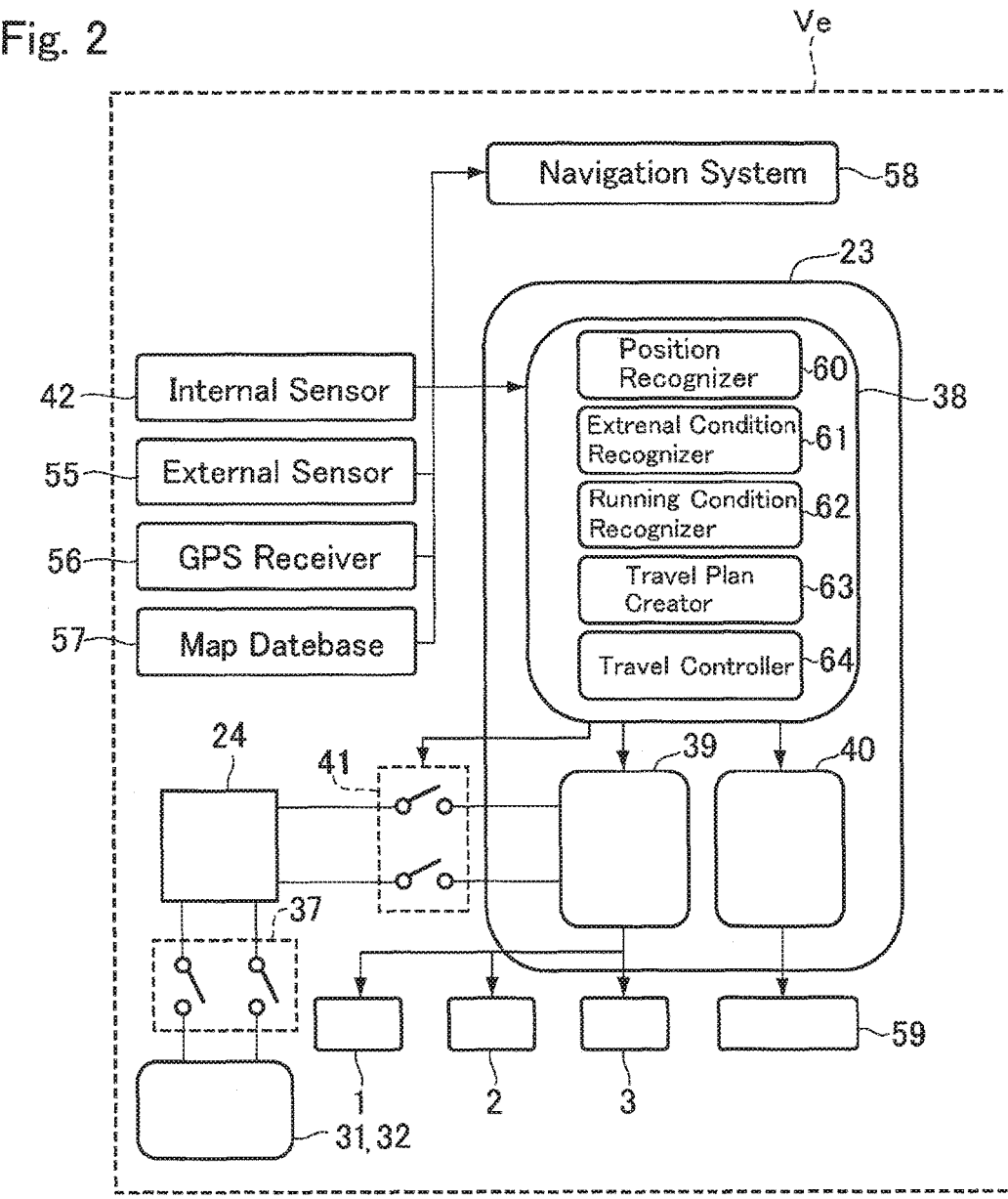
FIG. 2 is a schematic illustration showing the control system according to the embodiment of the present disclosure.

A configuration of the controller 23 is shown in FIG. 2. The controller 23 comprises a main controller 38, a drive controller 39 and a sub-controller 40. Output signals from the main controller 38 are sent to the drive controller 39 and the sub-controller 40. Incident signals to the drive controller 39 are converted into drive commands and further transmitted to a throttle actuator of the engine 1, the first motor 2, and the second motor 3. Incident signals to the sub-controller 40 is converted into appropriate command signals and further transmitted to actuators 59 of the brake 30 etc.

In order to selectively connect and disconnect the drive controller 39 to/from the battery 24 depending on an operating condition of the switch button or key for energizing the relay switch 37, a main switch 41 is arranged between the battery 24 and the drive controller 39. For example, when the switch button is pressed, the main switch 41 is turned on, and then, if the switch button is pressed for a predetermined period of time, the relay switch 37 is turned on. The main switch 41 is controlled by the main controller 38 to automatically allow and interrupt electric power supply to the drive controller 39.

The main controller 38 is an electronic control unit composed mainly of a microcomputer. To the main controller 38, detection signals and information about operating conditions and behaviors of constituent elements of the vehicle Ve are transmitted from an internal sensor 42. Specifically, the internal sensor 42 includes an accelerator sensor 44 for detecting a position of an accelerator pedal 43, a brake sensor (or switch) 46 for detecting a depression of a brake pedal 45, a steering sensor 48 for detecting a steering angle of the steering wheel 47, a vehicle speed sensor 49 for detecting rotational speeds of the wheels 27 and 29, a longitudinal acceleration sensor 50 for detecting a longitudinal acceleration of the vehicle Ve, a lateral acceleration sensor 51 for detecting a lateral acceleration of the vehicle Ve, a yaw rate sensor 52 for detecting a yaw rate of the vehicle, a shift sensor 54 for detecting a position of a shift lever (or switch) 53 and so on. The main controller 38 transmits command signals for controlling the engine 1, the first motor 2 and the second motor 3 to the drive controller 39, and transmits command signals for controlling the brake 30 and so on to the sub-controller 40 based on incident signals from the internal sensor 42 as well as maps and formulas installed in advance. In FIG. 1, dashed-lines represent transmission of signals between the internal sensor 42 and the controller 23, and between the controller 23 to the engine 1, the first motor 2, the second motor 3 and the brake 30.

As described, the vehicle Ve is operated autonomously while manipulating the engine 1, the first motor 2, the second motor 3, the brake 30 and so on by the controller 23. In addition, the steering system 28, the parking lock mechanism 20 and so on are also controlled by the controller 23.

In order to operate the vehicle Ve autonomously, detection signals from external sensors 55 for detecting external conditions are also sent to the main controller 38. For example, the external sensor 55 includes at least one of an on-board camera, a RADAR (i.e., a radio detection and ranging) a LIDAR (i.e., a laser imaging detection and ranging), an ultrasonic sensor and so on.

Specifically, the on-board camera is arranged inside of a windshield glass, and transmits recorded information about the external condition to the main controller 38. To this end, not only a monocular camera but also a stereo camera having a plurality of lenses and image sensors to achieve a binocular vision may be used as the on-board camera. If the stereo camera is used as the on-board camera, the main controller 38 is allowed to obtain three-dimensional information in the forward direction.

The RADAR is adapted to detect obstacles utilizing radio waves such as millimetric-waves and microwaves, and to transmit detected information to the main controller 38. Specifically, the RADAR detects an obstacle such as other vehicles and so on by emitting radio waves and analyzing the radio waves reflected from the obstacle.

Likewise, the LIDAR is adapted to detect obstacles utilizing laser light and to transmit detected information to the main controller 38. Specifically, the LIDAR detects an obstacle such as other vehicles and so on by emitting laser light and analyzing the laser light reflected from the obstacle.

In addition, the vehicle Ve is further provided with a GPS (i.e., global positioning system) receiver 56, a digital map database 57, and a navigation system 58. Specifically, the GPS receiver 56 is adapted to obtain a position (i.e., latitude and longitude) based on incident signals from GPS satellites, and to transmit the positional information to the main controller 38. The map database 57 may be installed in the main controller 38, but map information stored in external online information processing systems may also be available. The navigation system 58 is configured to determine a travelling route of the vehicle Ve based on the positional information obtained by the GPS receiver 56 and the map database 57.

The main controller 38 carries out calculations based on the incident data or information from the internal sensor 42 and the external sensor 55 as well as the preinstalled data, and calculation results are sent in the form of command signal to the drive controller 39 and the sub-controller 40. The incident signals to the drive controller 39 are converted into drive commands, and further transmitted to the throttle actuator of the engine 1, and the first inverter 31 and the second inverter 32 of the first motor 2 and the second motor 3. The incident signals to the sub-controller 40 is converted into appropriate command signals and further transmitted to the actuators 59 of the brake 30, the steering system 28 and so on.

The actuator 59 includes a brake actuator, a steering actuator and so on. Specifically, the brake actuator is adapted to actuate the brake 30 to control braking force applied to the wheels 27 and 29 in response to reception of the command signal from the sub-controller 40. The steering actuator is adapted to activate an assist motor of the steering system 28 to control a steering torque in response to reception of the command signal from the sub-controller 40.

The main controller 38 comprises a position recognizer 60, an external condition recognizer 61, a running condition recognizer 62, a travel plan creator 63, a travel controller 64 and so on.

Specifically, the position recognizer 60 is configured to recognize a current position of the vehicle Ve on the map based on the positional information received by the GPS receiver 56 and the map database 57. The current position of the vehicle Ve may also be obtained from the positional information used in the navigation system 58. Optionally, the vehicle Ve may also be adapted to communicate with external sensors arranged along the road to obtain the current position of the vehicle Ve.

The external condition recognizer 61 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer 62 is configured to recognize running condition of the vehicle Ve such as a vehicle speed, a longitudinal acceleration, a lateral acceleration, a yaw rate and so on based on detection result of the internal sensors 42.

The travel plan creator 63 is configured to create a travel locus of the vehicle Ve based on a target course determined by the navigation system 58, a position of the vehicle Ve recognized by the position recognizer 60, and an external condition recognized by the external condition recognizer 61. That is, the travel plan creator 63 creates a travel locus of the vehicle Ve within the target course in such a manner that the vehicle Ve is allowed to travel safely and properly while complying traffic rules.

In addition, the travel plan creator 63 is further configured to create a travel plan in line with the created travel locus. Specifically, the travel plan creator 63 creates a travel plan in line with the target course based on the external conditions recognized by the external condition recognizer 61 and the map database 57.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 63 creates a future plan to change a vehicle speed, acceleration, steering torque etc. during travelling along the target course in the form of e.g., a map.

Alternatively, the travel plan creator 63 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller 64 is configured to operate the vehicle Ve autonomously in line with the travel plan created by the travel plan creator 63. To this end, specifically, the travel controller 64 transmits command signals to the actuators 59, or the engine 1, the first motor 2 and the second motor 3 through the drive controller 39 and the sub-controller 40.

The vehicle Ve may be operated autonomously without a driver to pick up a passenger at a desired pickup location by entering a desired pickup time and location into the main controller 38. To this end, the main controller 38 automatically turns on the main switch 41 at a time calculated based on the desired pickup time and location. However, the vehicle Ve may arrive at the pickup location earlier than an estimated time of arrival depending on traffic on the planed route. In this case, if the vehicle Ve has to wait the passenger for a long time while turning on the main switch 41, activation of the drive controller 39 is maintained while consuming electric power. In order to prevent such waste of electric power, it is preferable to turn off the main switch 41. However, once the main switch 41 is turned off, the drive controller 39 has to be started up by turning on the main switch 41 after picking up the passenger, and such procedure takes time. Consequently, the vehicle Ve may not be allowed to launch promptly.

Figure 3:
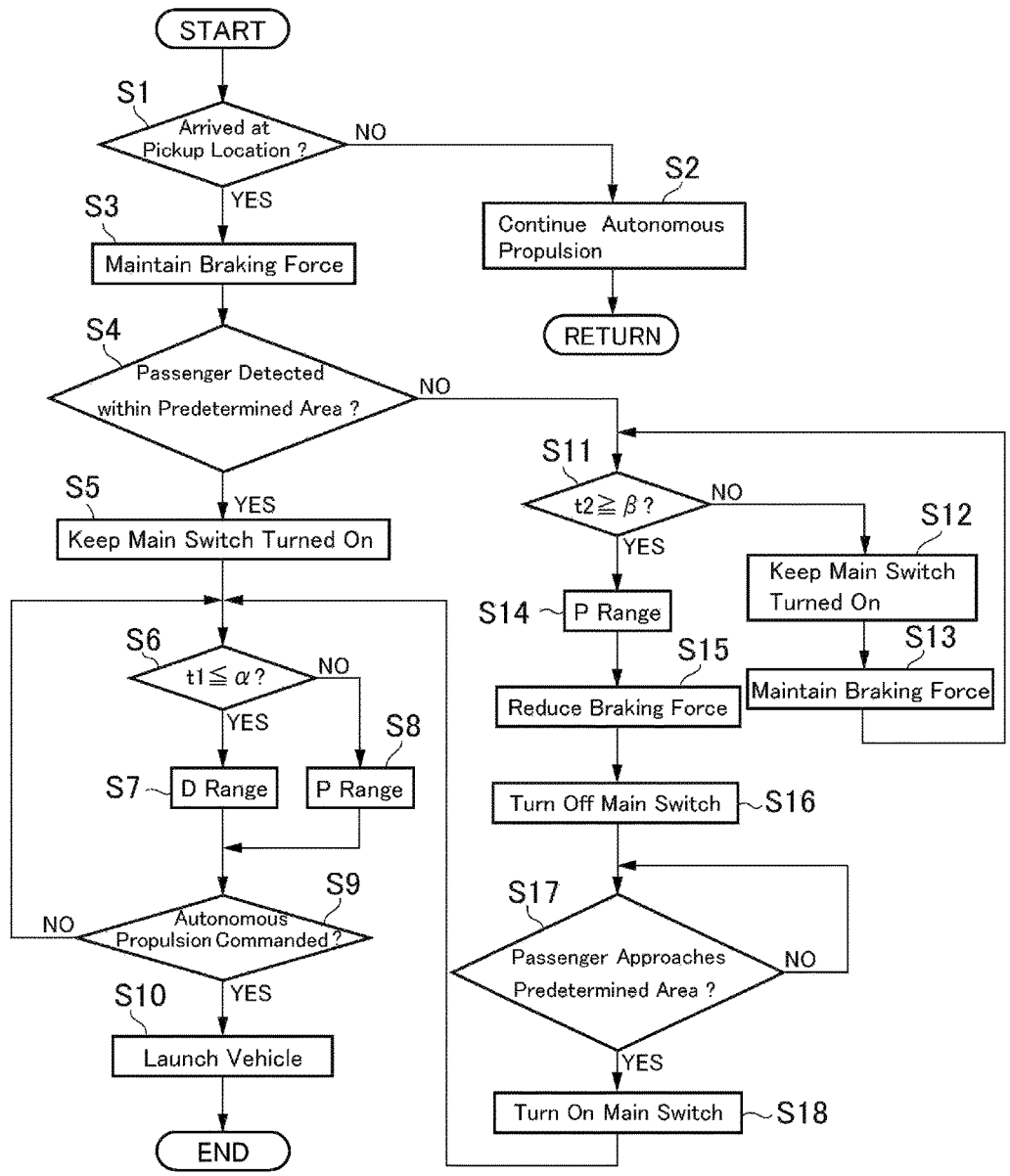
FIG. 3 is a flowchart showing a control example executed by the control system according to the embodiment of the present disclosure.

In order to avoid the above-explained disadvantages, the control system according to the embodiments of the present disclosure executes a routine shown in FIG. 3 to launch the vehicle Ve promptly after picking up the passenger at the pickup location, and to save electricity while waiting the passenger at the pickup location.

The routine shown in FIG. 3 is started when the vehicle Ve is launched autonomously to the pickup location to pick up a passenger. First of all, it is determined at step S1 whether or not the vehicle Ve has arrived at the pickup location. Such determination at step S1 may be made with reference to a destination entered into the main controller 38 and positional information obtained by the position recognizer 60.

If the vehicle Ve has not yet arrived at the pickup location so that the answer of step S1 is NO, the routine progresses to step S2 to continue autonomous propulsion to the pickup location, and then returns. By contrast, if the vehicle Ve arrives at the pickup location so that the answer of step S1 is YES, the routine progresses to step S3 to maintain the braking forces being applied to the wheels 27 and 29. Then, the routine progresses to step S4 to determine a presence of the passenger within a predetermined area around the vehicle Ve. In other words, at step S4, it is determined whether or not a startup of the drive controller 39 can be completed before the passenger gets in the vehicle Ve, or before the vehicle Ve launches after picking up the passenger. To this end, the predetermined area may be set based on a required period of time to complete a startup of the drive controller 39, and a required period of time for the passenger to get in the vehicle Ve at the pickup location, or a required period of time to command the vehicle Ve to propel autonomously after the vehicle Ve arrived at the pickup location. For example, a presence of the passenger within the predetermined area around the vehicle Ve may be determined based on a fact that: a wireless signal from the key of the vehicle Ve is received by the vehicle Ve; or a door is opened and closed by the passenger. Optionally, at step S4, occupancy of the vehicle seat may be determined for each seat. To this end, a pressure sensor may be arranged in each seat to send a signal e.g., to the main controller 38.

If the control system detects a passenger within the predetermined area around the vehicle Ve so that the answer of step S4 is YES, the routine progresses to step S5 to keep the main switch 41 turned on.

At the pickup location, the passenger may not always get in the vehicle Ve promptly. In addition, although the passenger gets in the vehicle Ve, the passenger may not always command the vehicle Ve to launch immediately to the next destination. In those cases, if the relay switch 37 is continuously turned on, electric power is continuously consumed to supply standby power to the first motor 2 and the second motor 3 as long as the vehicle Ve is stopped. By contrast, if the relay switch 37 is turned off, the vehicle Ve is launched after turning on the relay switch 37. Consequently, commencement of propulsion of the vehicle Ve lags behind a transmission of a command signal to launch the vehicle Ve autonomously. In order to avoid such disadvantages, the control system compares an elapsed time t1 from a time point at which the passenger was detected at step S4 to a time point at which the passenger commands the vehicle Ve to start autonomous propulsion, to a first predetermined period α that is fundamentally required for the passenger to command the vehicle Ve to start autonomous propulsion from a time point at which the vehicle Ve picks up the passenger. If the elapsed time t1 is shorter than the first predetermined period α, the relay switch 37 is maintained to be turned on. By contrast, if the elapsed time t1 is longer than the first predetermined period α, the relay switch 37 is turned off. In this case, in order to save time to start the drive controller 39 before launching the vehicle Ve, activation of the drive controller 39 is maintained.

Specifically, after maintaining the main switch 41 to be turned on at step S5, the routine progresses to step S6 to determine whether or not the elapsed time t1 is equal to or shorter than the first predetermined period α. If the elapsed time t1 is equal to or shorter than the first predetermined period α so that the answer of step S6 is YES, the routine progresses to step S7 to maintain an operating range to a drive range. In this case, specifically, the main switch 41 and the relay switch 37 are continuously turned on, and the braking forces of the brakes 30 applied to the wheels 27 and 29 are maintained. By contrast, if the elapsed time t1 exceeds the first predetermined period α so that the answer of step S6 is NO, the routine progresses to step S8 to shift the operating range to a parking range. In this case, the relay switch 37 is turned off while keeping the main switch 41 to be turned on, and the parking lock mechanism 20 is actuated to engage the parking pawl 21 with the parking gear 19 thereby locking the output shaft 18. In other words, the vehicle Ve is brought into a neutral state in which a torque transmission between the engine 1 and the drive wheels 27 is interrupted while stopping a rotation of the output shaft 18. In this case, after engaging the parking pawl 21 with the parking gear 19, the braking forces of the brakes 30 applied to the wheels 27 and 29 may be reduced.

After thus selecting the operating range at step S7 or S8, the routine progresses to step S9 to determine whether or not the vehicle Ve is commanded to propel autonomously to the next destination. For example, such determination at step S9 may be made based on a fact that the next destination is entered into the navigation system 58. If the vehicle Ve is commanded to propel autonomously so that the answer of step S9 is YES, the routine progresses to step S10 to launch the vehicle Ve autonomously. In this situation, if the operating range is in the drive range, the vehicle Ve is launched autonomously while reducing the braking forces of the brakes 30. By contrast, if the operating range is in the parking range, the vehicle Ve is launched autonomously by shifting the operating range to the drive range, while disengaging the parking pawl 21 from the parking gear 19 and turning on the relay switch 37.

By contrast, if the vehicle Ve is not commanded to propel autonomously so that the answer of step S9 is NO, the routine returns to step S6 to repeat the determination of step S6. In this case, steps S7 and S9 are repeated until the elapsed time t1 exceeds the first predetermined period α. Then, steps S6, S8 and S9 are repeated until the vehicle Ve is commanded to propel autonomously.

If the passenger is not present within the predetermined area around the vehicle Ve at the pickup location, the vehicle Ve will not start autonomous propulsion from the pickup location and hence it is preferable to interrupt electric power supply to the drive controller 39 so as to save the electric power. By contrast, if the passenger appears at the pickup location before the arrival of the vehicle Ve at the pickup location, the vehicle Ve may be launched immediately when picking up the passenger. In this case, it is preferable to maintain the activation of the drive controller 39 to allow the vehicle Ve to launch promptly. In order to fulfill such requirements, the control system compares a waiting time t2 from a time point at which the vehicle Ve arrives at the pickup location to a time point at which the passenger appears within the predetermined area at the pickup location, to a second predetermined period β that is fundamentally required for the passenger picked up by the vehicle Ve to command the vehicle Ve to start autonomous propulsion from a time point at which the vehicle Ve arrives at the pickup location. That is, the second predetermined period β is longer than the first predetermined period α. If the waiting time t2 is longer than the second predetermined period β, electric power supply to the drive controller 39 is interrupted. By contrast, if the waiting time t2 is shorter than the second predetermined period β, the electric power is continuously supplied to the drive controller 39.

Specifically, if the control system does not detect a passenger within the predetermined area around the vehicle Ve so that the answer of step S4 is NO, the routine progresses to step S11 to determine whether or not the waiting time t2 is equal to or longer than the second predetermined period β. If the waiting time t2 is shorter than the second predetermined period β so that the answer of step S11 is NO, the routine progresses to step S5 to keep the main switch 41 turned on. Then, the routine progresses to step S13 to maintain the braking forces of the brakes 30 being applied to the wheels 27 and 29, and returns to step S11. By contrast, if the waiting time t2 exceeds the second predetermined period β so that the answer of step S11 is YES, the routine progresses to step S14 to shift the operating range to the parking range. Then, the routine progresses to step S15 to reduce the braking force of the brakes 30 being applied to the wheels 27 and 29, and further progresses to step S16 to turn off the main switch 41.

In the case that the waiting time t2 is longer than the second predetermined period β, the vehicle Ve may not be launched promptly after picking up the passenger if the main switch 41 is turned off. In order to avoid such disadvantage, after turning off the main switch 41 at step S16, the routine progresses to step S17 to determine whether or not the passenger approaches the predetermined area around the vehicle Ve. Such determination at step S17 may be made based on the same factors as those used at step S4. If the passenger does not approach the predetermined area around the vehicle Ve so that the answer of step S17 is NO, the determination at step S17 is repeated. By contrast, if the passenger approaches the predetermined area around the vehicle Ve so that the answer of step S17 is YES, the routine progresses to step S18 to turn on the main switch 41. Then, the routine progresses to step S6 to execute steps S6 to S10 by the above-explained procedures. Alternatively, at step S17, it is also possible to determine boarding of the passenger on the vehicle Ve based on the signal from the pressure sensor arranged in the vehicle seat.

Thus, in the case that the passenger is detected within the predetermined area around the vehicle Ve, the main switch 41 is turned on to activate the drive controller 39. That is, the drive controller 39 has already been started when the passenger gets in the vehicle Ve, or when the passenger commands the vehicle Ve to start autonomous propulsion. In this case, therefore, the vehicle Ve is allowed to promptly start autonomous propulsion. In this situation, the engine 1 may be operated while the vehicle Ve is stopped to charge the battery 24 by operating the first motor 2 as a generator. In addition, an oil pump and so on may be driven by the engine 1.

If the elapsed time t1 is longer than the first predetermined period α, that is, if the vehicle Ve is waiting for the passenger for a long time since detecting the passenger, the relay switch 37 is turned off while maintaining the main switch 41 turned on. That is, electric power supply to the first motor 2 and the second motor 3 is stopped while maintaining activation of the drive controller 39. In this situation, therefore, the vehicle Ve can be launched promptly upon receipt of a command to propel the vehicle Ve autonomously, and electricity consumption can be reduced until the vehicle Ve is commanded to start autonomous propulsion. As described, in the vehicle Ve, output power of the engine 1 is delivered to the drive wheels 27 by establishing reaction torque by the first motor 2. In the vehicle Ve, therefore, the transmission route R is brought into the neutral state by stopping electric power supply to the first motor 2 and the second motor 3. In this situation, output torque of the engine 1 will not be delivered to the drive wheels 27 and hence the vehicle Ve can be prevented from being propelled unintentionally.

In addition, in the case that the elapsed time t1 is longer than the first predetermined period α, a power loss resulting from actuating the brake 30 may be reduced by locking the parking gear 19 by the parking lock mechanism 20.

In the case that the waiting time t2 is longer than the second predetermined period β, the main switch 41 is temporality turned off so that electric power supply to the drive controller 39 is interrupted to save to save the electric power.

In this case, the standby power supplied to the first motor 2 and the second motor 3 can be saved by turning off the relay switch 37.

In this case, a power loss resulting from actuating the brake 30 may also be reduced by locking the parking gear 19 by the parking lock mechanism 20. In addition, after thus locking the parking gear 19 by the parking lock mechanism 20, torsion in the transmission route between the output shaft 18 and the drive wheels 27 may be eliminated before the boarding of the passenger by reducing the braking forces of the brake devices 30. Consequently, the passenger will not sense shocks resulting from eliminating the torsion in the transmission route.

In this case, when the passenger appears at the pickup point after turning off the main switch 41, the main switch 41 is turned on again to startup the drive controller 39. For this reason, the vehicle Ve is allowed to promptly start autonomous propulsion when the passenger gets in the vehicle Ve, or when the passenger commands the vehicle Ve to start autonomous propulsion.

Although the above exemplary embodiments of the present application have been described, it will be understood by those skilled in the art that the present application should not be limited to the described exemplary embodiments, and various changes and modifications can be made within the spirit and scope of the present application. For example, electric power supply from the battery 24 to the RADAR and the LIDAR may also be interrupted by another relay switch. In this case, electric power supply to the RADAR and the LIDAR is stopped if the elapsed time t1 is longer than the first predetermined period α, or if the waiting time t2 is longer than the second predetermined period β to save electricity. The RADAR and the LIDAR may be activated when the vehicle Ve is commanded to propel autonomously or when the passenger approaches the predetermined area around the vehicle Ve to launch the vehicle Ve promptly.

What is claimed is:

1. A vehicle control system that is applied to a vehicle having a power source, a drive motor, a brake device that applies braking torque to a wheel, and a steering system that turns the wheels, comprising:
    a controller that controls the drive motor, the brake device and the steering system to operate the vehicle autonomously,
    a relay switch that is manipulated by the controller to selectively connects and disconnects the drive motor to/from the power source,
    wherein the controller comprises a drive controller which controls the drive motor and to which electric power is supplied from the power source,
    wherein the vehicle control system further comprises a main switch that is manipulated by the controller to selectively connect and disconnect the drive controller to/from the power source,
    wherein the controller is configured to automatically turn on the main switch if a passenger is detected within a predetermined area at a pickup location after propelling the vehicle autonomously to the pickup location to pick up the passenger, and
    wherein the controller is further configured to turn off the relay switch if an elapsed time from a time point at which the passenger was detected to a time point at which the passenger commands the vehicle to start autonomous propulsion is longer than a first predetermined period.

2. The vehicle control system as claimed in claim 1, further comprising:
    a torque transmission route for delivering an output torque of the drive motor to drive wheels; and a parking lock mechanism that stops a rotation of a predetermined rotary member arranged in the torque transmission route irrespective of electric power supply from the power source, and that is manipulated by the controller to selectively allow and inhibit the rotary member to rotate, and wherein the controller is further configured to stop the rotation of the rotary member by the parking lock mechanism if the elapsed time is longer than the first predetermined period.

3. A vehicle control system that is applied to a vehicle having a power source, a drive motor, a brake device that applies braking torque to a wheel, and a steeling system that turns the wheels, comprising:

a controller that controls the drive motor, the brake device and the steeling system to operate the vehicle autonomously, wherein the controller comprises a drive controller which controls the drive motor and to which electric power is supplied from the power source, wherein the vehicle control system further comprises a main switch that is manipulated by the controller to selectively connect and disconnect the drive controller to/from the power source, wherein the controller is configured to propel the vehicle autonomously to a pickup location to pick up a passenger, and to turn on the main switch if the passenger is detected within a predetermined area at the pickup location, and wherein the controller is further configured to turn off the main switch if the passenger is not detected within the predetermined area at the pickup location, and if a waiting time from a time point at which the vehicle arrives at the pickup location to a time point at which the passenger appears within the predetermined area at the pickup location is longer than a second predetermined period.

4. The vehicle control system as claimed in claim 3, further comprising:

a relay switch that is manipulated by the controller o selectively connects and disconnects the drive motor to/from the power source, wherein the controller is further configured to turn off the relay switch if the waiting time is longer than the second predetermined period.

5. The vehicle control system as claimed in claim 3, further comprising:

a torque transmission route for delivering an output torque of the drive motor to drive wheels; and a parking lock mechanism that stops a rotation of a predetermined rotary member arranged in the torque transmission route irrespective of electric power supply from the power source, and that is manipulated by the controller to selectively allow and inhibit the rotary member to rotate, wherein the controller is further configured to stop the rotation of the rotary member by the parking lock mechanism if the waiting time is longer than the second predetermined period.

6. The e control system as claimed in claim 3, wherein the controller is further configured to:

turn off the main switch if the waiting time is longer than the second predetermined period; and turn on the main switch again when the passenger approaches the predetermined area at the pickup location after turning off the main switch.

* * * * *

UNITED STATES PATENT AND TRADEMARK OFFICE
CERTIFICATE OF CORRECTION

PATENT NO. : 10,392,017 B2
APPLICATION NO. : 15/688363
DATED : August 27, 2019
INVENTOR(S) : Seki et al.

It is certified that error appears in the above-identified patent and that said Letters Patent is hereby corrected as shown below:

In the Claims

At Column 13, Line 13, change "a steeling system" to "a steering system"

At Column 13, Line 16, change "the steeling system" to "the steering system"

At Column 14, Line 6, change "the controller o" to "the controller to"

Signed and Sealed this
Nineteenth Day of November, 2019

Andrei Iancu
*Director of the United States Patent and Trademark Office*